UNITED STATES PATENT OFFICE.

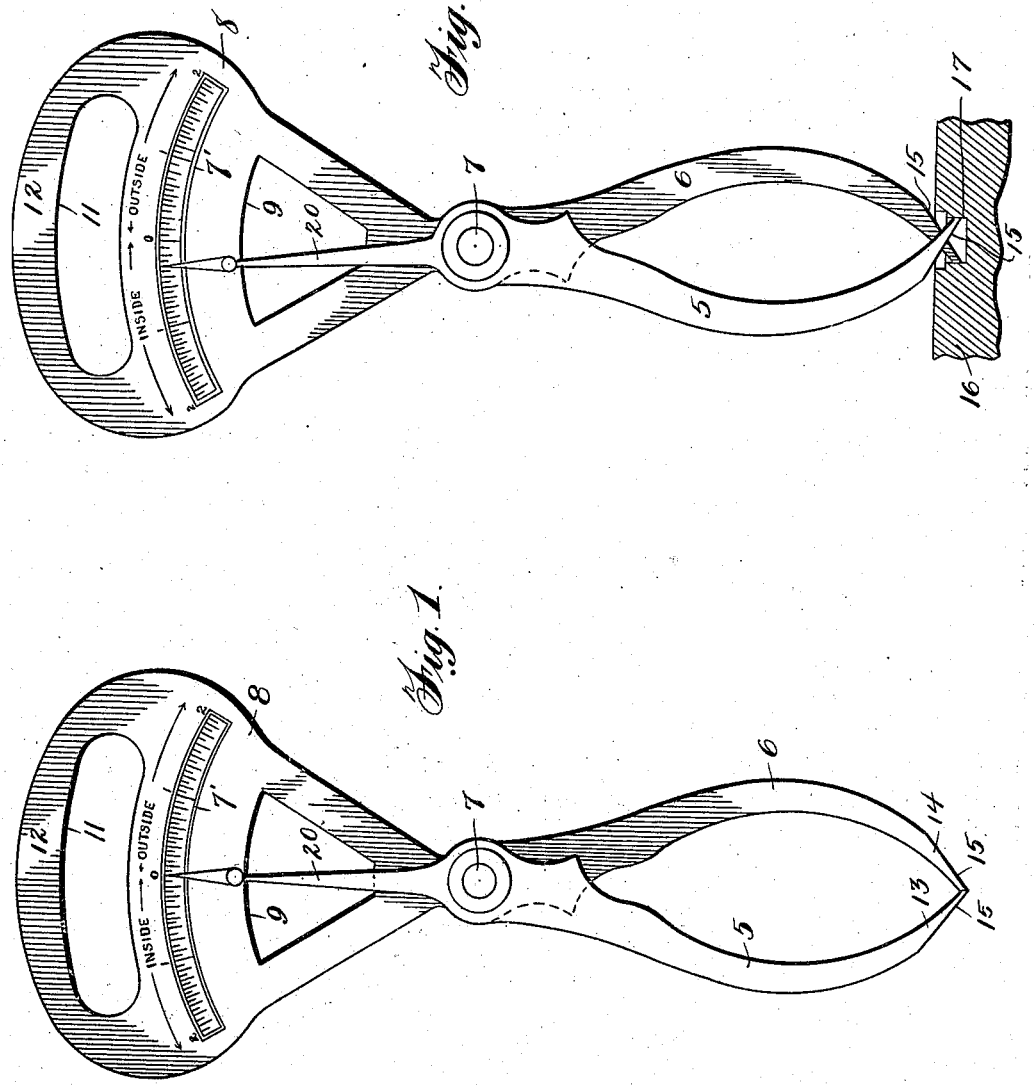

JESSE STOWELL HUGHES, OF DUNSMUIR, CALIFORNIA.

CALIPERS.

No. 924,073.  Specification of Letters Patent.  Patented June 8, 1909.

Application filed May 5, 1908. Serial No. 430,960.

*To all whom it may concern:*

Be it known that I, JESSE STOWELL HUGHES, citizen of the United States, residing at Dunsmuir, in the county of Siskiyou and State of California, have invented certain new and useful Improvements in Calipers, of which the following is a specification.

My invention relates to calipers and has for its object the provision of a device of this character constructed in such manner that it may be used to measure either an outside measurement or diameter or an inside measurement or diameter, said caliper being provided with a scale and a pointer, the pointer indicating either of the foregoing measurements upon the scale.

A further object of the invention is the provision of a device of the character above described and having improved holding means whereby the operator will be enabled to secure a firm grasp upon the caliper to manipulate the same without covering the scale and obscuring the same.

Furthermore, it is desired to provide a caliper of this character constructed in such manner that when an article to be measured is held in the left hand of the user and the caliper is grasped by the right hand of the user, the thumb of the right hand will lie in such position that the points may be closed against the object to be measured by the engagement of the thumb with the pointer.

Further objects and advantages of the invention will be set forth in the detailed description which now follows.

In the accompanying drawings: Figure 1 is a side elevation of a caliper constructed in accordance with the invention and with the pointer at zero; and Fig. 2 is a side elevation showing the caliper points in position for an inside measurement.

Like numerals designate corresponding parts in both figures of the drawing.

Referring to the drawing, the numerals 5 and 6 designate caliper blades, said caliper blades being pivoted to each other at as 7. The blade 5 is continued beyond its pivot point to form a pointer 20. The outer end of this pointer travels over a scale 7', said scale being formed upon an enlarged head 8. This head is a continuation of the blade 6 and is cut away as at 9 to reduce the weight of the parts. The hand-hole 11 is formed in the head 8 and is adapted to admit the hand of the operator with the exception of the thumb, it being understood that the portion 12 above said hand-hole lies within the palm of the operator when the device is in use. By referring to the drawing it will be seen that the zero point of the scale is at the center of said scale and that the graduations of the scale increases upon each side of said zero point. If desired the words "Inside" and "Outside" may be placed upon the head 8 adjacent the scale to indicate that the measurements upon one side of the zero point indicate inside measurements and that the measurements upon the opposite side of the zero point indicate outside measurements.

The operation of the device is as follows: The points 13 and 14 are adapted to move past each other when the blades are forced together, said points overlapping each other as indicated in Fig. 2. When the points lie in this position they are adapted to register an inside measurement upon that portion of the scale to the left of the zero mark, while when the blades are forced apart in Fig. 1 they are adapted to register outside measurements upon that portion of the scale to the right of the zero mark.

Any desired construction of pivot 7 may be employed and I wish it to be understood that the invention is not limited with respect to the manner of pivoting the blades 5 and 6 to each other. A certain degree of curvature of the blades 5 and 6 is desirable, but if this curvature were continued all the way to the points of the blades very fine interior measurements could not be had, for the reason that the points would have to be moved a considerable distance before they would clear each other. In order to obviate this difficulty, the points 13 and 14 are cut away as at 15.

In Fig. 2 a member 16 having a recess 17 formed therein has been illustrated. This figure clearly illustrates the manner of using the caliper herein shown and described for interior measurements.

It is apparent that when the caliper is grasped by the operator, the pointer is in such position that it may be moved by the thumb of the hand that holds said caliper. By virtue of this construction, it is possible for the user to hold the object to be measured, such as a small shaft for instance, in the left hand and hold the caliper and manipulate the movable blade thereof entirely with the other hand.

It is to be understood that the invention is not limited to the particular graduation shown upon the scale 7, for finer or coarser graduation may be adopted without departure from the spirit of the invention.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth but includes within its purview such changes as may be made within the scope of the appended claims.

Having described my invention what I claim is:

1. A caliper comprising a pair of blades 5 and 6, pivotally mounted with relation to each other, one of said blades terminating in an enlarged head and the other of said blades terminating in a pointer adapted to travel over said head, said head bearing a scale having a centrally arranged zero point and graduations increasing in equal proportions upon both sides of said zero point, said enlarged head being formed in one piece with the blade by which it is carried and there being a hand opening adapted to receive the hand of the operator formed through said head outside of said scale.

2. A caliper comprising a pair of blades 5 and 6, pivotally mounted with relation to each other, one of said blades terminating in an enlarged head and the other of said blades terminating in a pointer adapted to travel over said head, said head bearing a scale having a centrally arranged zero point and graduations increasing in equal proportions upon both sides of said zero point, said enlarged head being formed in one piece with the blade by which it is carried and there being a hand opening adapted to receive the hand of the operator formed through said head outside of said scale, the lower ends of the blades being curved toward each other and the outer sides of the extremities of said blades being cut away in a straight line to form points substantially as shown and described.

3. In a device of the character described the combination with a pair of blades pivotally mounted with relation to each other and adapted to move across each other of an enlarged head carried by one of said blades, there being a scale formed upon said head having a central zero point and increasing in equal proportions upon both sides of said zero point and there being an opening formed through said head outside of said scale, said opening being adapted to receive the hand of the operator.

4. In a device of the character described the combination with a pair of blades pivotally mounted with relation to each other and adapted to move across each other of an enlarged head carried by one of said blades, there being a scale formed upon said head having a central zero point and increasing in equal proportions upon both sides of said zero point, there being an opening formed through said head outside of said scale, said opening being adapted to receive the hand of the operator and the lower ends of said blades being curved toward each other and the outer sides of the extremities of said blades being cut away to form points, substantially as shown and described.

5. In a device of the character described the combination with a pair of blades of means for pivotally mounting said blades with relation to each other, a pointer carried by one of said blades and an enlarged head carried by the other of said blades over which said pointer travels, there being a scale formed upon said head with which said pointer coacts and an elongated opening formed in said head outside of said scale, said opening being adapted to receive the hand of the operator.

In testimony whereof I affix my signature, in presence of two witnesses.

JESSE STOWELL HUGHS.

Witnesses:
J. W. HAWKINS,
J. W. LEAHY.